UNITED STATES PATENT OFFICE 2,491,220

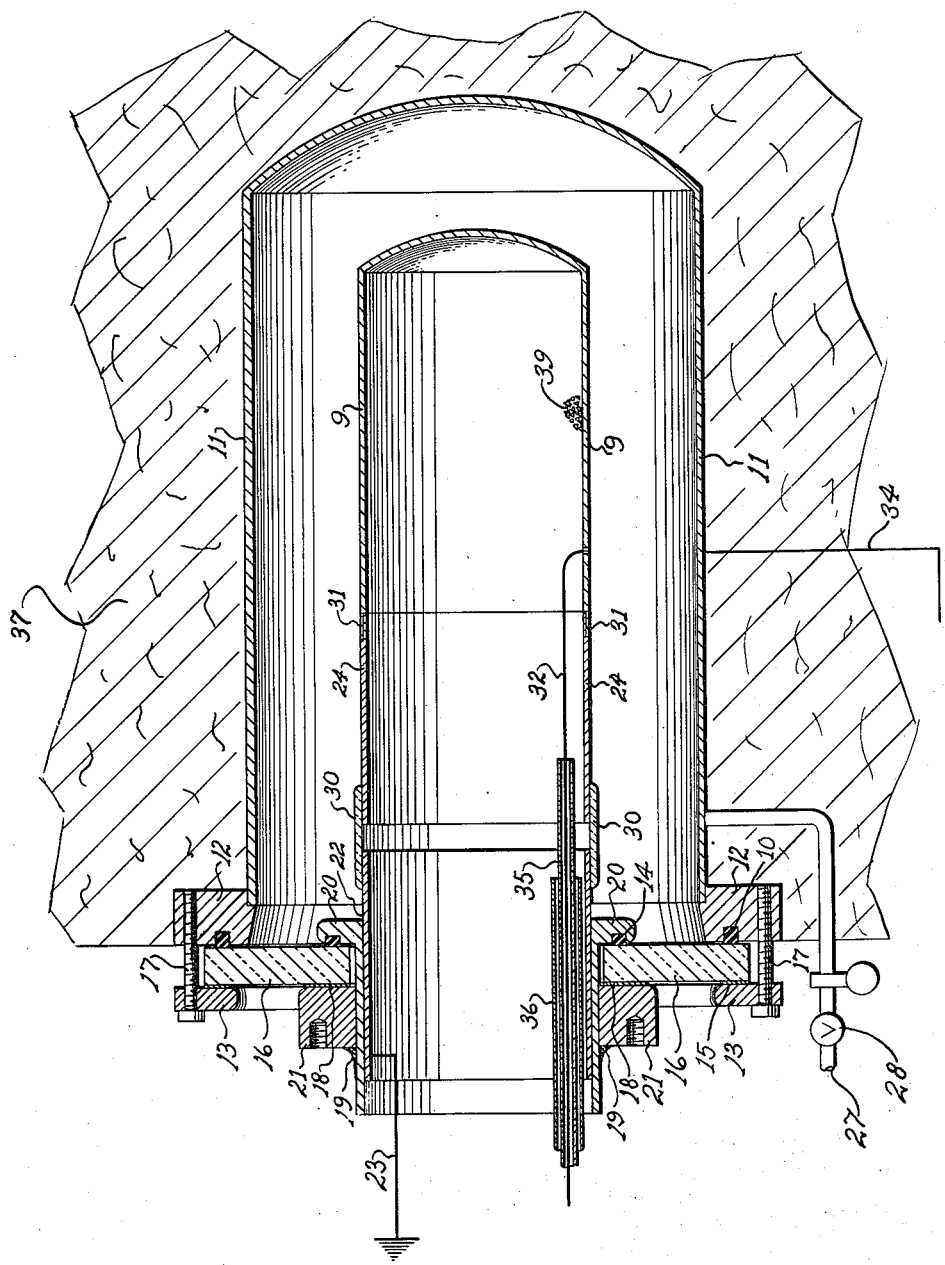

NEUTRON DETECTOR

Emilio G. Segrè, Santa Fe, N. Mex., and Clyde E. Wiegand, Berkeley, Calif., assignors to the United States of America as represented by the United States Atomic Energy Commission Application September 4, 1945, Serial No. 614,402

6 Claims. (Cl. 250—83.6)

This invention relates to a device for the detection of neutrons, particularly to the detection of small numbers of neutrons from various emitters.

Since a neutron carries no charge, a device for detecting the presence of neutrons differs somewhat from a conventional ion chamber, proportional counter, Geiger-Müller counter, or other such devices in which a suitable medium is ionized by being directly subjected to the ionizing radiation to be measured. While it is known to slow down fast neutrons to thermal energies and employ the resulting thermal neutrons to indirectly effect ionization, the magnitude of which is proportional to the intensity of neutron emission causing the event, devices heretofore known for the detection of neutrons in this manner have not been satisfactory for the measurement of neutrons when in the presence of gamma rays or other sources of ionizing radiation.

It is therefore a primary object of the invention to provide an improved neutron detector of extreme sensitivity adapted to detect the presence of very small numbers of neutrons, such as the neutrons resulting from impurities in alpha emitters, for example, detection of the neutron emission from plutonium.

A further object of the invention is to provide an improved neutron detector which detects the presence of neutrons when accompanied by gamma rays in a manner to substantially eliminate the heretofore undesirable action of the gamma rays on the detector.

Other objects and advantages will become apparent to persons skilled in the art upon examination of the drawings, the description, and the claims appended thereto.

Referring to the drawing which illustrates a device incorporating the present invention, a pair of concentrically disposed and radially spaced cylinders 9 and 11 provide an annular chamber therebetween. Cylinder 11 finds its support in flange 12, marginally clamped to one end thereof, the opposite end of cylinder 11 being closed. Cylinder 11, flange 12, and annular clamp ring 13, associated therewith, may be of steel. An annular glass insulating element 16 is maintained in clamped engagement between flange 12 and ring 13 under pressure applied by screws 17, lead gasket 15 being interposed between ring 13 and element 16 to permit proper clamping pressure to be applied to the glass, which is cushioned by rubber ring 10. Insulator 16, having a central apertured portion, provides support for the inner assembly of the device including clamping elements 20 and 21, maintained clamped about the inner marginal portions of element 16, for example, by being welded together at 19 or by other suitable means such as by threaded engagement. The insulator 16 is cushioned by rubber ring 14 and lead gasket 18 between clamping elements 20 and 21.

A cylinder 22 complementarily engages a cylindrical portion of clamping element 20 in pressed fit relation and may be soldered thereto, cylinder 22 being electrically grounded as illustrated by conduit 23. Cylinder 22 is of Kovar metal, as is the adjacent portion 24 of cylinder 9 to permit a glass insulating sleeve 30 to be bonded therebetween to electrically insulate cylinder 9 which provides one of the electrodes of the device, from its supporting structure, cylinder 22 providing a guard ring, grounded at 23, forming an extension to the exterior of the device. The Kovar portion of cylinder 9 extends to telescopic joint 31, the remainder of the cylinder being preferably of steel.

Electrical connection from cylinder 9 to the grid of a fast pulse amplifier is made through conductor 32, surrounded by a glass insulator 35 extending completely through cylinder 22 to terminate within the Kovar portion 24 of cylinder 9. Insulator 35 is concentrically supported within a brass cylinder 36 extending from the open end of cylinder 22 substantially through the length thereof to prevent ion collection over that portion of conduit 32. Cylinder 11 is connected through conductor 34 to a source of negative potential, not shown, for example to the negative side of D. C. source of 5000 volts, the positive side of which is grounded.

It will be noted that the closed end of cylinder 9 and the adjacent end of cylinder 11 are outwardly convex, the degree of convexity of the end walls being such as to define a uniform passage therebetween of width corresponding to the radial width of the annular passage intermediate cylinder 9 and cylinder 11 lateral and closing end walls. A thick wall of paraffin 37 completely encloses cylinder 11 and cylinder 9 disposed therein for a purpose later described.

The sealed chamber intermediate electrodes 9 and 11 is evacuated through suitable means not shown, associated with conduit 27, very pure borontrifluoride being then introduced within the chamber until a relatively high pressure, for example a pressure of two atmospheres, is obtained, valve 12 then being closed. It has been found that commercial borontrifluoride is ineffective for use in the above device because the impurities contained in the gas attract electrons resulting from ionization of the gas by alpha particles released upon nuclear disintegration of boron atoms by thermal neutrons. Since the pulse collected on the positive anode is the result of electron sweep thereto, the absence of impurities which substantially decrease electron sweep is essential. While the present detector operates satisfactorily with very pure borontrifluoride, containing normal boron isotope content, it is preferred to employ very pure borontrifluoride enriched with the isotopic boron 10 ($B^{10}$). The effectiveness of the detector increases in direct proportion to the percentage of boron 10 atoms in the gas.

Operation of the detector above described is as follows. The material to be tested, for example, an alpha emitter such as plutonium having small numbers of neutrons emitted therefrom due to impurities, or to spontaneous fission, is introduced through open end cylinder 22 to the interior of cylinder 9, the material being preferably disposed either in the central portion or near the closed end of cylinder 9, as illustrated by numeral 39. Neutrons emitted from the material under test will of course travel in all directions. The emitted neutrons are "fast" or "high energy" neutrons a large portion of which travel in directions to traverse the gas filled chamber intermediate electrodes 9 and 11. Due to the low capture cross-section of the gas in respect to fast neutrons, they produce substantially no ionization. However, upon traversal of the outer electrode 11 and entry of paraffin 37, a portion of the fast neutrons will be slowed to thermal energies and by diffusion will reenter the borontrifluoride filled chamber. Since the capture cross-section of the borontrifluoride molecules may be roughly considered to vary inversely in respent to the velocity of the neutrons traversing the gas, the borontrifluoride will now present a relatively high capture cross-section with the result that high energy alpha particles are emitted from the nuclei of the boron atoms disrupted by slow neutrons.

While neutrons cannot cause direct ionization of the borontrifluoride due to the absence of charge thereon, the resulting high energy alpha particules cause substantial ionization of the surrounding gas. Since it is desired to obtain fast action from such a detector, the known principle of electron collection rather than positive ion collection may be employed in the device, electrons being collected on the inner electrode 9 which is maintained at high positive potential in respect to electrode 11. The sweep time thus obtained is in the order of 1000 times faster than the sweep time obtainable if the collection of positive ions were used for recording the event, since the sweep time is in inverse ratio to the relative masses of electrons and positive ions.

As above stated, the device is adapted to detect neutrons when accompanied by gamma rays. While gamma rays cause direct ionization of the gas, the magnitude of ionization due to the gamma rays, being confined to the detachment of an occasional outer electron, is negligible, within limits, in comparison to the magnitude of ionization due to the high energy of alpha particles and hence may be safely ignored as a contributing factor toward the total ionization recorded by the detector.

The percentage of neutrons detected by the above described apparatus has been found to exceed the percentage of neutrons detected by prior art devices, for example with a gaseous medium containing approximately 79 percent $B^{10}$, in the order of 5 percent of the total number of neutrons emitted from a radium plus beryllium source are detected. The device has been found to be substantially unaffected by gamma ray emission from the source in the amount of 10 millicuries of radium or less. Due to the increased neutron detection, the resultant high sensitivity of the device permits detection of neutrons of an order insufficient to be recorded by less sensitive devices. The sensitivity of the recorder can be further increased by increasing the $B^{10}$ content of the gas.

The apparatus described and illustrated above teaches a preferred embodiment of the invention, the broad aspects of which are not to be limited to the specific apparatus, the invention being more generally defined in the following claims.

We claim:

1. In a device of the character described, a first elongated metallic tube having an open end and a closed end, a second metallic tube having elongated lateral walls, a closing end wall and an open end being similar in shape to the first tube and larger in magnitude, said second tube being supported in superposed position over the first tube and orientated in a direction similar to the first tube, means comprising a gas impermeable barrier between the second tube open end and the opposed exterior wall of the first tube, means for maintaining the first tube at a potential positive with respect to the second tube, a gaseous medium disposed in the space intermediate the walls of the first and second tube and barrier, said gaseous medium having a low capture cross-section with respect to fast neutrons and a high capture cross-section with respect to thermal energy neutrons, and means completely enclosing said second container lateral and closing end walls in a material characterized by the ability to slow and diffuse neutrons penetrating the same.

2. A neutron detector comprising a first elongated metal container comprising a portion having a closed end and a portion having an open end, means for supporting the portion of said container terminating in the open end in insulated collinear relation with the portion terminating in the closed end, a second metal container having an elongated portion, a closed end portion and an open end, enclosing all of the first container closed end portion and part of the first container open end portion, an insulating, fluid-impermeable barrier secured to the open end of the second tube and the outer wall of the first tube open portion to thereby provide a fluid tight enclosure between the first and second containers, means for impressing a potential across the first container closed end portion and the outer container, a gaseous medium having a low capture cross-section to fast neutrons and a high capture cross-section to slow neutrons confined within said enclosure, and a hydrogenous material enclosing the elongated and closed end portions of the second container for slowing and diffusing fast neutrons entering therein.

3. In a device of the character described, a cylindrical anode electrode having an elongated portion terminated by a closed end and an open end, said open end being for the purpose of admitting into the elongated portion radioactive material to be tested, an elongated cylindrical cathode electrode, having an open end and a closed end, for surrounding said anode electrode in concentrically spaced relation thereto, said cathode closed end being spaced from the closed end of said anode, and insulating means sealing the cathode open end with said anode to provide a chamber intermediate said electrode sealed from the atmosphere, said chamber being filled with a medium having a high cross section to atomic disintegration by slow neutrons resulting in released alpha particles, said medium being ionizable by alpha particles, and a hydrogen containing element in contiguous and completely enclosing relation to the cathode electrode cylindrical portion and closed end.

4. In a neutron detector, the combination with outer and inner metallic containers defining a generally cylindrical intervening chamber sealed to the atmosphere, means maintaining said outer container at a high negative potential in respect to the inner container, said chamber being filled with borontrifluoride at a pressure exceeding atmospheric, said outer container being substantially enclosed by a wall of paraffin.

5. In a neutron detector, the subcombination comprising a generally cylindrical metallic container provided at one end thereof with a closure cap and at the opposite end thereof with an outwardly extending marginal flange, clamp means associated with said marginal flange for the support of a centrally apertured electrically insulating element forming a partial closure for said flanged end, a second elongated generally cylindrical element having a closed end portion and an open end portion and means maintaining said portions in an electrically insulating relation, means clamping the open end portion of said second element to said insulating element for the support of said second container partially within said first container in concentrically spaced relation therewith, means for connecting said first container and the closed end portion of said second container to a source of potential, and means maintaining the space defined intermediate said containers filled with a medium ionizable by a reaction initiated by slow neutrons, said space being sealed from the atmosphere.

6. In a device of the character described, an open ended metallic container, a second container enclosing said first container in gas sealing relation to the atmosphere, means maintaining said open ended container at a positive potential in respect to said second container, borontrifluoride disposed in the volume defined intermediate said containers at a pressure greater than atmospheric, and a neutron slowing and diffusing material completely enclosing said second container.

EMILIO G. SEGRÈ.
CLYDE E. WIEGAND.

REFERENCES CITED

The following references are of record in the file of this patent:

UNITED STATES PATENTS

| Number | Name | Date |
| --- | --- | --- |
| 2,220,509 | Brons | Nov. 5, 1940 |
| 2,288,718 | Kallmann et al. | July 7, 1942 |
| 2,378,219 | Hare | June 12, 1945 |